(12) United States Patent
Salter et al.

(10) Patent No.: US 10,308,175 B2
(45) Date of Patent: Jun. 4, 2019

(54) ILLUMINATION APPARATUS FOR VEHICLE ACCESSORY

(71) Applicant: Ford Global Technologies, LLC, Dearborn, MI (US)

(72) Inventors: Stuart C. Salter, White Lake, MI (US); Anthony Dwayne Cooprider, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/259,569

(22) Filed: Sep. 8, 2016

(65) Prior Publication Data

US 2018/0065546 A1 Mar. 8, 2018

(51) Int. Cl.
| | |
|---|---|
| *B60Q 3/00* | (2017.01) |
| *H05B 37/02* | (2006.01) |
| *B60Q 3/80* | (2017.01) |
| *F21V 9/30* | (2018.01) |
| *F21V 7/00* | (2006.01) |
| *H05B 33/08* | (2006.01) |
| *B60Q 3/14* | (2017.01) |
| *B60Q 3/16* | (2017.01) |
| *F21Y 115/10* | (2016.01) |

(52) U.S. Cl.
CPC ............... *B60Q 3/80* (2017.02); *B60Q 3/14* (2017.02); *B60Q 3/16* (2017.02); *F21V 7/00* (2013.01); *F21V 9/30* (2018.02); *H05B 33/0854* (2013.01); *H05B 37/0218* (2013.01); *H05B 37/0227* (2013.01); *H05B 37/0272* (2013.01); *F21Y 2115/10* (2016.08)

(58) Field of Classification Search
CPC .............. B60Q 3/00; B60Q 3/16; B60Q 3/20; B60Q 3/30; H05B 33/08; H05B 37/02; H05B 37/0218; H05B 37/0227; H05B 37/0272
See application file for complete search history.

(56) References Cited

U.S. PATENT DOCUMENTS

| | | | |
|---|---|---|---|
| 2,486,859 A | 11/1949 | Meijer et al. | |
| 5,053,930 A | 10/1991 | Benavides | |
| 5,434,013 A | 7/1995 | Fernandez | |
| 5,709,453 A | 1/1998 | Krent et al. | |
| 5,839,718 A | 11/1998 | Hase et al. | |
| 6,031,511 A | 2/2000 | DeLuca et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Thai Pham
(74) *Attorney, Agent, or Firm* — Vichit Chea; Price Heneveld LLP

(57) ABSTRACT

An illumination apparatus for a vehicle accessory is disclosed. The apparatus comprises a lighting device disposed proximate the vehicle accessory comprising a persistent luminescent portion. The persistent luminescent portion is configured to charge in response to an excitation emission from a light source. The apparatus further comprises a detection sensor configured to detect a device proximate the vehicle and a controller configured to activate the light source in response to the detection. The light source is configured to charge the persistent luminescent portion to emit an output emission.

19 Claims, 5 Drawing Sheets

(56) References Cited

U.S. PATENT DOCUMENTS

| | | | |
|---|---|---|---|
| 6,117,362 A | 9/2000 | Yen et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 6,992,461 B2 | 1/2006 | Liang et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,207,663 B2 | 6/2012 | Sambandan et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,378,631 B2 | 2/2013 | Ron et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 * | 6/2015 | Buttolo | H03K 17/94 |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2006/0229808 A1 * | 10/2006 | Manabe | G01C 21/26 |
| | | | 701/414 |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0085728 A1 * | 4/2009 | Catten | H04K 3/415 |
| | | | 340/425.5 |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0147426 A1 * | 6/2013 | Misono | B60R 16/03 |
| | | | 320/108 |
| 2013/0257363 A1 * | 10/2013 | Lota | H02J 7/0047 |
| | | | 320/108 |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0118549 A1 * | 5/2014 | Meldrum | B60R 1/00 |
| | | | 348/148 |
| 2014/0203770 A1 * | 7/2014 | Salter | H02J 7/0047 |
| | | | 320/108 |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0320823 A1 * | 10/2014 | Ammar | B60R 1/12 |
| | | | 353/13 |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2015/0307033 A1 | 10/2015 | Preisler et al. | |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |

(56) References Cited

U.S. PATENT DOCUMENTS

2016/0240794 A1  8/2016  Yamada et al.
2017/0158125 A1  6/2017  Schuett et al.
2017/0253179 A1  9/2017  Kumada

FOREIGN PATENT DOCUMENTS

| | | |
|---|---|---|
| CN | 201193011 Y | 2/2009 |
| CN | 103606983 A | 2/2014 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

ILLUMINATION APPARATUS FOR VEHICLE ACCESSORY

FIELD OF THE INVENTION

The present disclosure generally relates to vehicle lighting systems, and more particularly, to vehicle lighting systems for vehicle accessories.

BACKGROUND OF THE INVENTION

Lighting in vehicles traditionally has been applied to provide illumination for reading, vehicle entry, and operation. However, lighting may also be applied to improve vehicle features and systems to ensure that vehicle passengers, operators, and onlookers have an improved experience. Such improvements may arise from improvements in safety, visibility, aesthetics, and/or features. The disclosure provides for a lighting system operable to illuminate a portion of a vehicle and in some embodiments, may alert an operator of the vehicle of a vehicle condition, such as a door ajar condition.

SUMMARY OF THE INVENTION

According to one aspect of the present disclosure, an illumination apparatus for a vehicle accessory is disclosed. The apparatus comprises a lighting device disposed proximate the vehicle accessory comprising a persistent luminescent portion. The persistent luminescent portion is configured to charge in response to an excitation emission from a light source. The apparatus further comprises a detection sensor configured to detect a device proximate the vehicle and a controller configured to activate the light source in response to the detection. The light source is configured to charge the persistent luminescent portion to emit an output emission.

According to another aspect of the present disclosure, an illumination apparatus for a vehicle accessory is disclosed. The apparatus comprises a lighting device disposed proximate the vehicle accessory and comprising a persistent luminescent portion. The persistent luminescent portion is configured to charge in response to an excitation emission from a light source. The apparatus further comprises a location detection device configured to detect a location of the vehicle and a controller configured to activate the light source in response the location of the vehicle approaching a parking location.

According to yet another aspect of the present disclosure, an illumination apparatus for a vehicle accessory is disclosed. The apparatus comprises a lighting device disposed proximate the vehicle accessory. The lighting device comprises a persistent luminescent portion configured to charge in response to an excitation emission from a light source. In response to receiving the excitation emission, the persistent luminescent portion is configured to emit an output emission. The apparatus further comprises a wireless radio transceiver configured to detect a mobile device proximate the vehicle and a controller. The controller is configured to activate the light source in response to the detection of the mobile device thereby charging the persistent luminescent portion.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
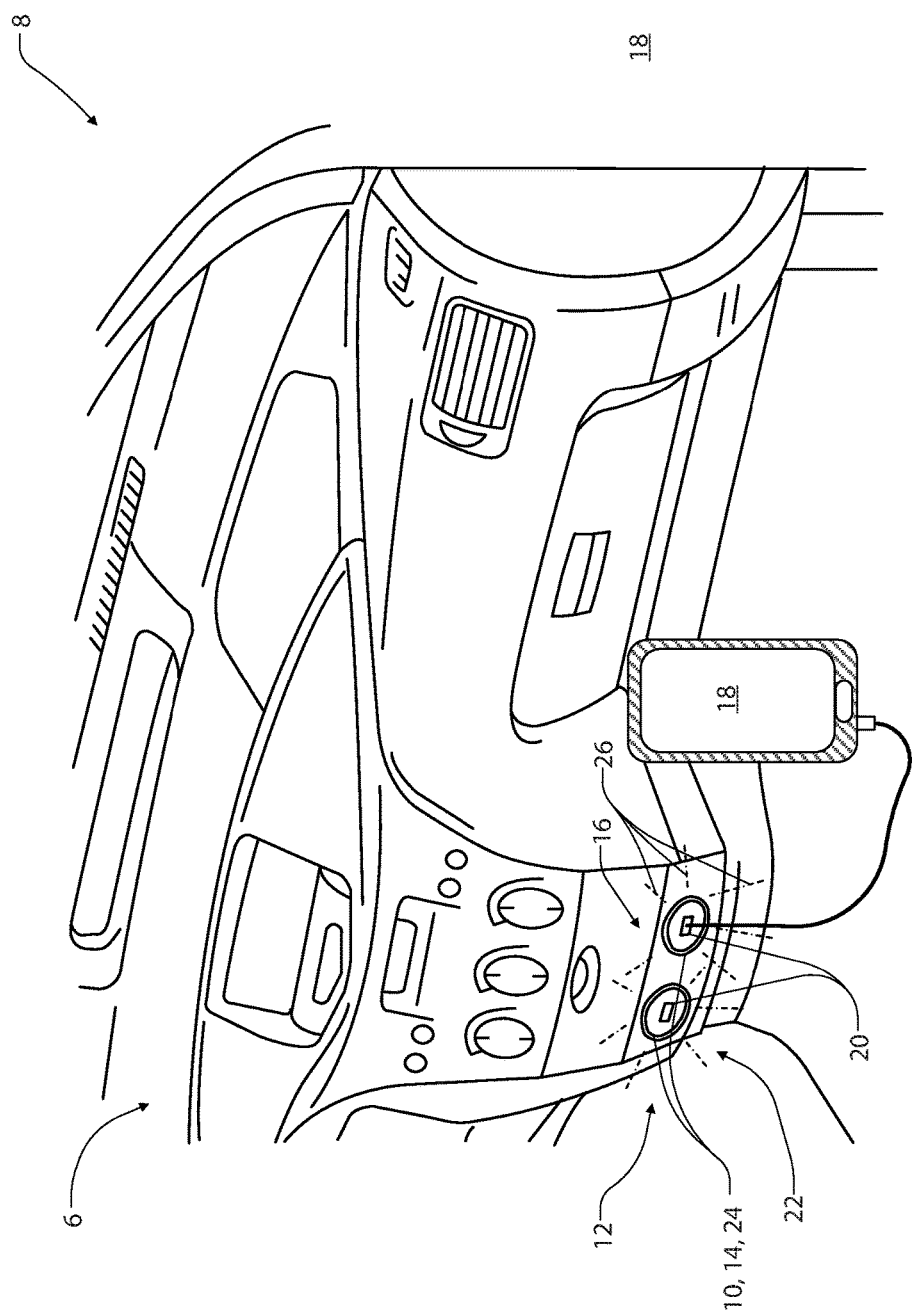
FIG. 1 is a perspective view of a passenger compartment of an automotive vehicle.

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The terms first, second, third, etc. as utilized herein may provide designations in reference to the figures for clarity. For example, a first portion and a second portion may be referred to in some implementations and only a second portion may be referred to in some additional implementations. Such designations may serve to demonstrate exemplary arrangements and compositions and should not be considered to designate a specific number of elements or essential components of any specific implementation of the disclosure, unless clearly specified otherwise. These designations, therefore, should be considered to provide clarity in reference to various possible implementations of the disclosure which may be combined in various combinations and/or individually utilized to clearly reference various elements of the disclosure.

The disclosure provides for a lighting apparatus configured to illuminate a vehicle accessory. The vehicle accessory may be in the form of a charging receptacle or device interface having a light source or indicator light configured to illuminate the lighting apparatus in response to one or more conditions identified by a controller. The conditions may correspond to a variety of detected events or scheduled tasks that may be previously programmed and/or identified by the controller. By selectively illuminating the vehicle accessory in response to detected events or scheduled tasks, the controller may provide for energy saving operation of the light source to illuminate the vehicle accessory while preserving energy.

The light source may be configured to illuminate a luminescent portion of the lighting apparatus by emitting light at a first wavelength, which may correspond to an activation emission or charging emission. The luminescent portion may comprise a persistent luminescent material configured to utilize the first wavelength of the light to charge the persistent luminescent material. In this configuration, the luminescent portion may be operable to sustain an output emission having at least a second emission after the light source is deactivated. The first wavelength of the light may correspond to a first color of light and the second wavelength may correspond to a second color of light, different from the first color. Though the various implementations of the vehicle accessory described herein refer to specific structures demonstrated in reference to at least one automotive vehicle, it will be appreciated that the lighting apparatus may be utilized in a variety of applications.

Referring to FIG. 1, a passenger compartment 6 of a vehicle 8 is shown demonstrating the lighting apparatus 10. The lighting apparatus 10 may form a portion of a lighting system 12 configured to illuminate and/or charge a luminescent portion 14 disposed proximate to or forming a portion of a vehicle accessory 16. The vehicle accessory 16 may correspond to a communication interface and/or charging port or receptacle configured to couple to a mobile device 18 via a device interface 20. The device interface 20 may correspond to an adaptor comprising a plurality of terminals configured to communicate and/or supply power to the mobile device 18. As discussed in the following detailed description, the lighting apparatus 10 may illuminate a location of the device interface 20 and provide light to illuminate a console 22 or other portions of the passenger compartment 6.

As discussed herein, the vehicle accessory 16 may correspond to a charging or communication interface configured to interconnect with the mobile device 18. The communication interface may correspond to a Universal Serial Bus (USB) interface, an IEEE 1394 port, an ATA port, an SATA port, an IEEE 1394 (FireWire) port, a PCI port, a PCI Express port, a PCMCIA port, or an ExpressCard port, and various similar communication interfaces. Additionally, in some embodiments, the vehicle accessory 16 may correspond to a charging port, which may be configured to supply energy to the mobile device 18. As discussed herein, the vehicle accessory 16 may correspond to various interfaces and/or devices without departing from the spirit of the disclosure.

In some embodiments, the lighting apparatus 10 may comprise or be in communication with a controller. The controller may be configured to control a light source 24 of the lighting apparatus 10 to limit power consumption of the light source 24. Additionally, the controller may be configured to control the light source 24 to ensure that the lighting apparatus 10 is illuminated in response to an anticipated user interaction with the vehicle accessory 16. In this way, the lighting apparatus 10 may be configured to illuminate or increase an intensity of an output emission 26 from the lighting apparatus 10 when the user interaction with the vehicle accessory 16 is expected and limit power usage by decreasing or deactivating the output emission 26 when the user interaction is less likely. The controller is discussed in further detail in reference to FIG. 5.

In some embodiments, the light source 24 may comprise the luminescent portion 14 configured to emit the output emission 26 in response to receiving an excitation emission from the light source 24. The luminescent portion 14 may comprise a persistent luminescent material. The persistent luminescent material may be configured to utilize the first wavelength of the light to charge the persistent luminescent material such that the output emission 26 may be sustained after the light source 24 is deactivated. In this configuration, the controller may activate the excitation emission from the light source 24 to charge the photoluminescent material of the lighting apparatus 10 in anticipation of a likely user interaction with the vehicle accessory 16.

For example, prior to an anticipated or expected user interaction, the controller may activate the excitation emission to charge the luminescent portion. In some embodiments, the controller may control the excitation emission to be emitted at a high intensity excitation emission such that the luminescent portion 14 is rapidly charged prior to the entry of a passenger or user of the vehicle 8 into the passenger compartment 6. Such a high intensity may charge the photoluminescent portion rapidly, but may not be ideal for some operating conditions or states of the vehicle 8. Accordingly, the controller may activate the high intensity excitation emission prior to an entry of the passenger and decrease or deactivate the excitation emission upon detecting the entry of the passenger into the passenger compartment 6. In this way, the controller may charge the lighting apparatus to illuminate the vehicle accessory 16 prior to an expected use while limiting power usage of the light source 24 during an idle state of the vehicle 8.

Figure 2:
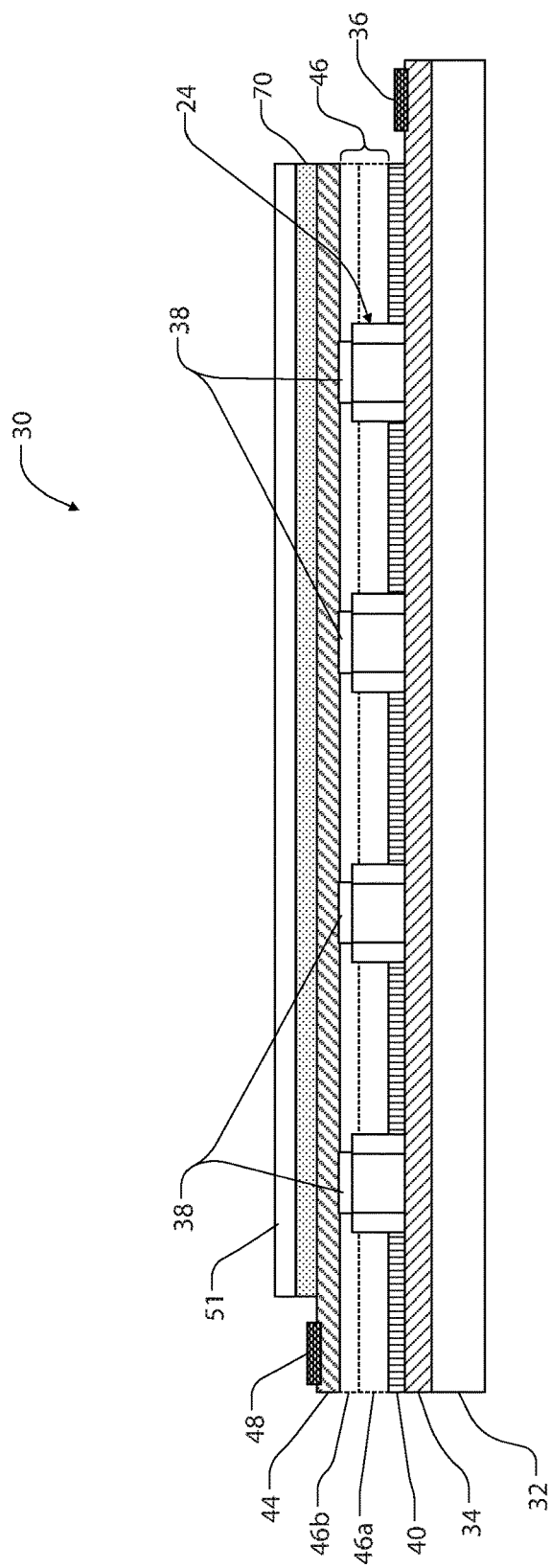
FIG. 2 is a detailed side view of a light producing assembly comprising a photoluminescent layer.

Referring now to FIG. 2, the light source 24 may correspond to a light producing assembly 30. The light producing assembly 30 may comprise a thin-film or printed light emitting diode (LED) assembly. The light producing assembly 30 may comprise a substrate 32. The substrate 32 may be opaque, transparent, or semi-transparent and may be thin. The light producing assembly 30 may be utilized in a variety of applications, which may require a thin overall thickness. The substrate 32 may be of a polymer, for example polycarbonate, poly-methyl methacrylate (PMMA), polyethylene terephthalate (PET), etc. In some embodiments, the substrate 32 may be dispensed from a roll to provide for integration into assembly operations for the light producing assembly 30 and may be approximately 0.005 to 0.060 inches thick.

In some embodiments, the substrate 32 may correspond to a reflective material configured to reflect light outward from the light producing assembly 30. The reflective material may correspond to a light colored or white material that is utilized to form or coat an insert molded material of the substrate 32. In this configuration, the substrate 32 may reflect light emitted from a plurality of light-emitting diode (LED) sources 38 outward from the light producing assembly 30. The reflective surface of the substrate 32 may serve to improve the efficiency of the light output from the light producing assembly 30 by limiting light that may be lost due to absorption into the substrate or other portions of the light producing assembly 30.

A first electrode 34 or conductive layer may be disposed on the substrate 32. The first electrode 34 and/or various electrodes or conductive layers discussed herein may comprise a conductive epoxy, such as a silver-containing or copper-containing epoxy. The first electrode 34 is conductively connected to a first bus bar 36. The first bus bar 36 and other bus bars or conduits discussed herein may be of metallic and/or conductive materials which may be screen printed on the electrodes or conductive layers. Bus bars may be utilized in the light producing assembly 30 to conductively connect a plurality of light-emitting diode (LED) sources 38 to a power source. In this way, the first bus bar 36, and other bus bars utilized in the light producing assembly, may be configured to uniformly deliver current along and/or across a surface of the light producing assembly 30.

The LED sources 38 may be printed, dispersed or otherwise applied to the first electrode 34 via a semiconductor ink 40. The LED sources 38 may be dispersed in a random or controlled fashion within the semiconductor ink 40. The LED sources 38 may correspond to micro-LEDs of gallium nitride elements, which may be approximately 5 microns to 400 microns across a width substantially aligned with the surface of the first electrode. The semiconductor ink 40 may include various binding and dielectric materials including but not limited to one or more of gallium, indium, silicon carbide, phosphorous and/or translucent polymeric binders. In this configuration, the semiconductor ink 40 may contain various concentrations of LED sources 38 such that a surface density of the LED sources 38 may be adjusted for various applications.

In some embodiments, the LED sources 38 and semiconductor ink 40 may be sourced from Nth Degree Technologies Worldwide Inc. The semiconductor ink 40 can be applied through various printing processes, including ink jet and silk screen processes to selected portion(s) of the substrate 32. More specifically, it is envisioned that the LED sources 38 are dispersed within the semiconductor ink 40, and shaped and sized such that a substantial quantity of them preferentially align with the first electrode 34 and a second electrode 44 during deposition of the semiconductor ink 40. The portion of the LED sources 38 that ultimately are electrically connected to the electrodes 34, 44 may be illuminated by a voltage source applied across the first electrode 34 and the second electrode 44. In some embodiments, a power source operating at 12 to 16 VDC from a vehicular power source may be employed as a power source to supply current to the LED sources 38. Additional information regarding the construction of a light producing assembly similar to the light producing assembly 30 is disclosed in U.S. Patent Publication No. 2014-0264396 A1 to Lowenthal et al., entitled "ULTRA-THIN PRINTED LED LAYER REMOVED FROM SUBSTRATE," filed Mar. 12, 2014, the entire disclosure of which is incorporated herein by reference.

The reflective properties of the substrate 32 may provide for improved output from the LED sources 38 in relation to the printing process utilized to apply the LED sources 38 to the first electrode 34 and the substrate 32. For example, the printing of the LED sources 38 may result in the misalignment of a number of the LED sources 38. That is, the majority of the LED sources may be positioned such that light is directed perpendicularly outward from the substrate 32. However, process variation in the printing process of the LED sources 38 may result in a misalignment of the LED sources 38 relative to the substrate 32. The reflective properties of the substrate 32 and/or the first electrode 34 may provide for improved output of the light generated by the LED sources 38 because the reflective surface of the substrate 32 may direct errant or misdirected emissions from the LED sources 38 outward from the substrate 32.

At least one dielectric layer 46 may be printed over the LED sources 38 to encapsulate and/or secure the LED sources 38 in position. The at least one dielectric layer 46 may correspond to a first dielectric layer 46a and a second dielectric layer 46b, which may be of a transparent material. The second electrode 44 may correspond to a top transparent conductor layer printed over the dielectric layer 46 to electrically connect the electrodes 34, 44. The second electrode 44 is conductively connected to a second bus bar 48. The bus bars 36, 48 may be utilized in the light producing assembly 30 to conductively connect a plurality of light-emitting diode (LED) sources 38 to the power source.

In some embodiments, the first electrode 34 and the second electrode 44 may correspond to a cathode electrode and an anode electrode, respectively. Though described as a cathode and an anode of the light producing assembly 30, the first electrode 34 and the second electrode 44 may be arranged such that the second electrode 44 (anode) is disposed on the substrate and the first electrode 34 (cathode) is disposed on the at least one dielectric layer 46. The bus bars 36, 48 may be printed along opposite edges of the electrodes 34, 44 and electrically terminate at anode and cathode terminals. Points of connection between the bus bars 36, 48 and the power source may be at opposite corners of each bus bar 36, 48 for uniform current distribution along each bus.

Still referring to FIG. 2, a photoluminescent layer 50 may be applied to the second electrode 44, which may correspond to the luminescent portion 14. The photoluminescent layer 50 may be applied as a coating, layer, film, and/or photoluminescent substrate. The photoluminescent layer 50 may be applied by screen printing, flexography, and/or otherwise affixed to the second electrode 44. In various implementations, the LED sources 38 may be configured to emit an excitation emission comprising a first wavelength corresponding to blue light. The LED sources 38 may be configured to emit the excitation emission into the photoluminescent layer 50 such that the photoluminescent material becomes excited. In response to the receipt of the excitation emission, the photoluminescent material converts the excitation emission from the first wavelength to an output emission comprising at least a second wavelength longer than the first wavelength. Additionally, one or more coatings 51 or sealing layers may be applied to an exterior surface of the light producing assembly 30 to protect the photoluminescent layer 50 and various other portions of the assembly 30 from damage and wear.

Figure 3:
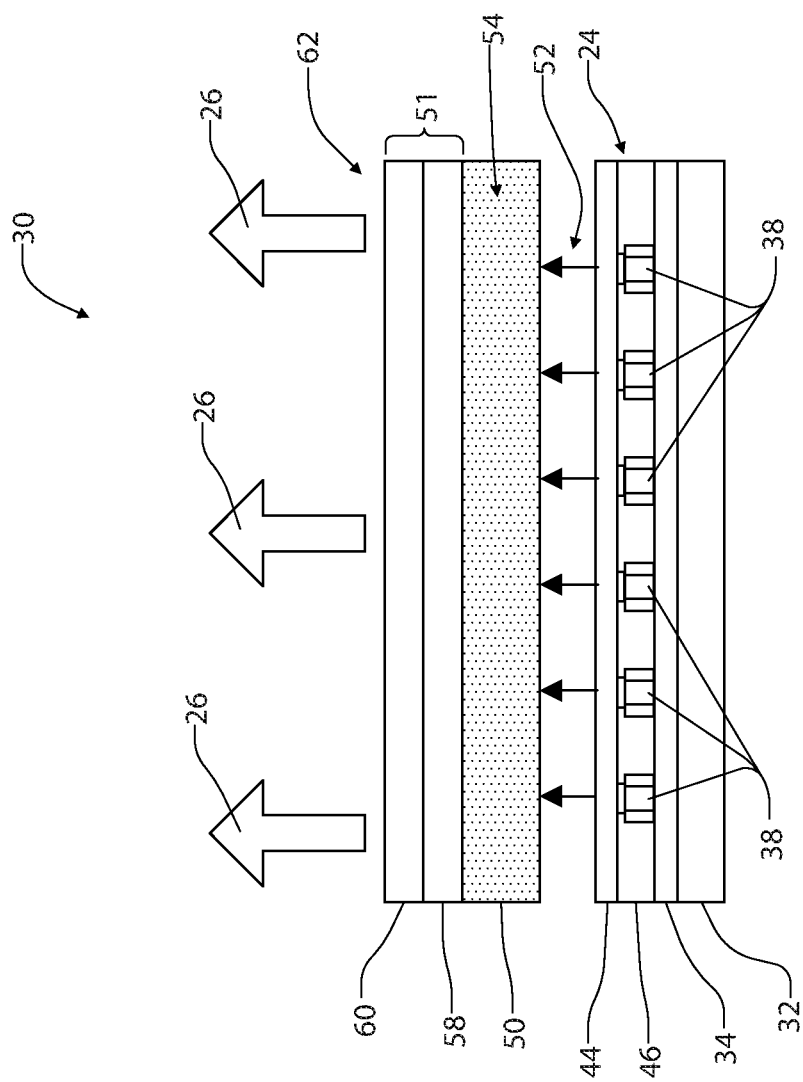
FIG. 3 is a side view of a light producing assembly demonstrating a photoluminescent layer configured to convert a wavelength of light.

Referring now to FIG. 3, a detailed view of photoluminescent layer 50 of the light producing assembly 30 is shown. The light producing assembly 30 is configured similar to the light producing assembly 30 demonstrated in FIG. 2, with like-numbered elements having the same or comparable function and structure. Though not shown in FIG. 3, the LED sources 38 are in electrical communication with the electrodes 34, 44 and a power source such that an excitation emission may be output from LED sources 38.

In an exemplary implementation, the excitation emission 52 may correspond to an excitation emission having a first wavelength corresponding to a blue, violet, and/or ultraviolet spectral color range. The blue spectral color range comprises a range of wavelengths generally expressed as blue light (~440-500 nm). In some implementations, the first wavelength may comprise a wavelength in the ultraviolet and near ultraviolet color range (~100-450 nm). In an exemplary implementation, the first wavelength may be approximately equal to 470 nm. Though particular wavelengths and ranges of wavelengths are discussed in reference to the first wavelength, the first wavelength may generally be configured to excite any photoluminescent material.

In operation, the excitation emission 52 is transmitted into an at least partially light transmissive material of the photoluminescent layer 50. The excitation emission 52 is emitted from the LED sources 38 and may be configured such that the first wavelength corresponds to at least one absorption wavelength of one or more photoluminescent materials disposed in the photoluminescent layer 50. For example, the photoluminescent layer 50 may comprise an energy conversion layer 54 configured to convert the excitation emission 52 at the first wavelength to the output emission 26 having a second wavelength, different from the first wavelength. The output emission 26 may comprise one or more wavelengths, one of which may be longer than the first wavelength. The conversion of the excitation emission 52 to the output emission 26 by the energy conversion layer 54 is referred to as a Stokes shift.

In some embodiments, the output emission 26 may correspond to a plurality of wavelengths. Each of the plurality of wavelengths may correspond to significantly different spectral color ranges. For example, the at least second wavelength of the output emission 26 may correspond to a plurality of wavelengths (e.g. second, third, etc.). In some implementations, the plurality of wavelengths may be combined in the output emission 26 to appear as substantially white light. The plurality of wavelengths may be generated by a red-emitting photoluminescent material having a wavelength of approximately 620-750 nm, a green emitting photoluminescent material having a wavelength of approximately 526-606 nm, and a blue or blue green emitting photoluminescent material having a wavelength longer than the first wavelength and approximately 430-525 nm. The plurality of wavelengths may be utilized to generate a wide variety of colors of light from each of the photoluminescent portions converted from the first wavelength. Though the particular colors of red, green, and blue are referred to herein, various photoluminescent materials may be utilized to generate a wide variety of colors and combinations to control the appearance of the output emission 26.

The photoluminescent materials, corresponding to the photoluminescent layer 50 or the energy conversion layer 54, may comprise organic or inorganic fluorescent dyes configured to convert the excitation emission 52 to the output emission 26. For example, the photoluminescent layer 50 may comprise a photoluminescent structure of rylenes, xanthenes, porphyrins, phthalocyanines, or other materials suited to a particular Stokes shift defined by an absorption range and an emission fluorescence. In some embodiments, the photoluminescent layer 50 may be of at least one inorganic luminescent material selected from the group of phosphors. The inorganic luminescent material may more particularly be from the group of Ce-doped garnets, such as YAG:Ce. As such, each of the photoluminescent portions may be selectively activated by a wide range of wavelengths received from the excitation emission 52 configured to excite one or more photoluminescent materials to emit an output emission having a desired color.

Still referring to FIG. 3, the light producing assembly 30 may further include the coating 51 as at least one stability layer 58 configured to protect the photoluminescent material contained within the energy conversion layer 54 from photolytic and/or thermal degradation. The stability layer 58 may be configured as a separate layer optically coupled and adhered to the energy conversion layer 54. The stability layer 58 may also be integrated with the energy conversion layer 54. The photoluminescent layer 50 may also optionally include a protection layer 60 optically coupled and adhered to the stability layer 58 or any layer or coating to protect the photoluminescent layer 50 from physical and chemical damage arising from environmental exposure.

The stability layer 58 and/or the protection layer 60 may be combined with the energy conversion layer 54 to form an integrated photoluminescent structure 62 through sequential coating or printing of each layer, or by sequential lamination or embossing. Additionally, several layers may be combined by sequential coating, lamination, or embossing to form a substructure. The substructure may then be laminated or embossed to form the integrated photoluminescent structure 62. Once formed, the photoluminescent structure 62 may be applied to a surface of at least one of the electrodes 34, 44 such that the excitation emission 52 received from the LED sources 38 is converted to the output emission 26. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

In some embodiments, the coating 51 may further comprise a colored layer applied to the light producing assembly 30 and configured to control or adjust an appearance of the light producing assembly 30 in an unilluminated state. As shown in FIG. 3, the colored layer may correspond to reference numerals 48 and/or 50. The colored layer may comprise an at least partially light transmissible polymeric layer or coating that may be applied to an outer surface of the light producing assembly 30. The colored layer may be tinted any color to suit a desired appearance of the light producing assembly 30.

Figure 4:
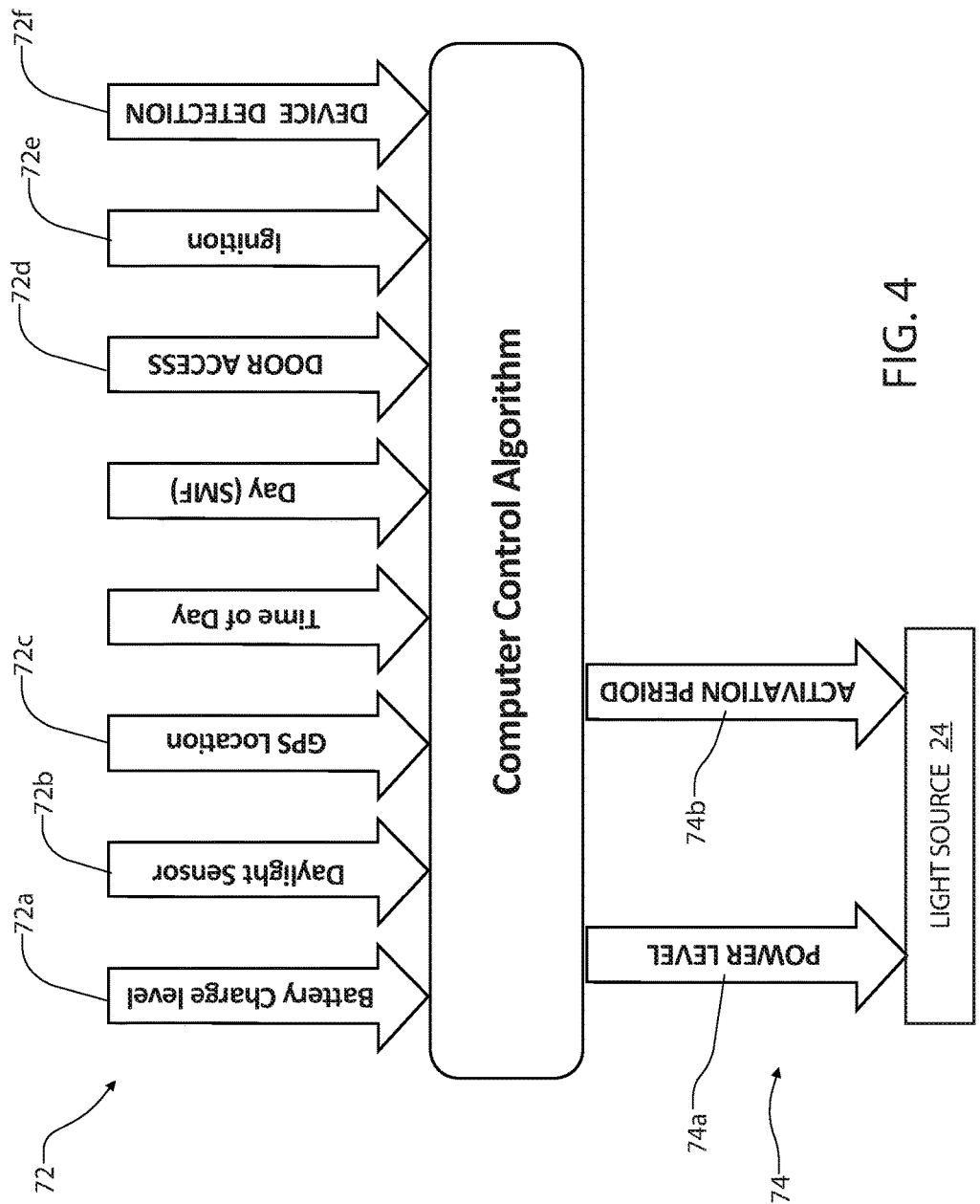
FIG. 4 is a control diagram for a lighting apparatus comprising a plurality of control inputs.

Referring now to FIG. 4, a control diagram for the lighting apparatus 10 is shown demonstrating a plurality of control inputs 72 that may be utilized by a control algorithm of the controller to control the activation of each of the light source 24. The control inputs 72 may correspond to signals received from various sensors incorporated in the vehicle, some of which may be communicated via a communication bus of the vehicle. The control inputs 72 may include any signals that may be communicated from one or more systems of the vehicle. Examples of control inputs may include a battery charge level 72a of the vehicle, an ambient light signal 72b from an ambient light sensor, a location signal 72c from a global positioning (GPS) device, a door access signal 72d from a vehicle door-ajar sensor, and an ignition signal 72e from a vehicle ignition. Based on the control inputs, the controller is configured to control the light source 24.

In some embodiments, the controller of the light apparatus may further be in communication with a detection signal 72f configured to detect a presence or proximity of the mobile device 18 as discussed in reference to FIG. 1. The detection signal 72f may correspond to a wireless radio transceiver in communication with the controller. The detection signal 72f may be configured to detect an approaching occupant by detecting a communication of the mobile device 18 via the wireless radio transceiver. In this way, the controller may identify that a potential occupant of the vehicle is approaching based on a detection or proximity profile of the mobile device 18. The wireless radio transceiver may correspond to a wireless communication module, which may include for example Bluetooth communications, Bluetooth Low Energy (BLE), Zigbee, WiFi or other band wireless communications. The mobile device 18 may correspond to a computer, laptop, tablet PC, phone, or similar devices.

In some embodiments, the controller may selectively activate the light source 24 to charge the luminescent portion 14 in response the vehicle approaching a parking location. The controller may utilize the location signal the from a global positioning (GPS) device to identify a parking location and to determine if the vehicle is approaching the parking location. The controller may determine the parking location in response to the location signal indicating that the vehicle is parked for a predetermined period of time in a location. Such a location may be stored in a memory of the controller and identified as a parking location.

Once stored in memory, the controller may identify that the vehicle is approaching the parking location based on the location signal identifying that the vehicle is within a predetermined distance of the parking location. In this way, the controller may activate the light source 24 to charge the luminescent portion 14 in response to detecting the vehicle is approaching the parking location. Accordingly, when the vehicle reaches the parking location, the luminescent portion 14 may be charged to illuminate the vehicle accessory 16.

In various embodiments, the controller may be configured to selectively activate the lighting system 12 in response to the ambient light signal 72*b* communicating that ambient light proximate the vehicle has diminished below a predetermined level. The controller may also selectively deactivate the light source 24 in response to the battery charge level 72*a* being communicated as being below a predetermined charge level for operation of the lighting system 12. The controller may also utilize the detection signal 72*f*, the door access signal 72*d*, and/or the ignition signal 72*e* to identify whether a passenger is inside the vehicle, has recently accessed the vehicle, and/or has recently operated the vehicle. In this way, the controller may control the light source 24 to predict the interaction of an occupant with the vehicle such that the light source may 24 be activated and deactivated in preparation for and upon arrival of an approaching occupant.

In some embodiments, the controller may be configured to control a plurality of control outputs 74 corresponding to the activation of the light source 24. The controller may also be configured to control a power level 74*a* and an activation period 74*b* of the light source 24. The activation period may correspond to a timing of activation, which may correspond to a charging cycle of the light source 24. In this configuration, the controller may provide for the selective activation of each of the light source 24 to selectively illuminate the vehicle accessory 16.

In some embodiments, the controller may be configured to selectively control the power level 74*a* and the activation period 74*b* of each light emitter of the light source 24. The controller may control the power level 74*a* and the activation period 74*b* in response to at least one of the ambient light signal 72*b*, a time of day, and/or a day of the week. The time of day or day of the week may be tracked by one or more timers of the controller. In this configuration, the controller may be configured to increase the power level 74*a* and/or adjust the activation period 74*b* of the light source 24 in response to the ambient light signal 72*b*.

For example, in some embodiments, the controller may increase a power level of the light source 24 and/or increase a periodicity of the activation period 74*b* of the light source 24 in response to the ambient light signal 72*b* and/or the time of day. In this way, the controller may control the lighting system 12 to adjust the illumination or operation of the light source 24 corresponding to a time wherein the ambient light level or daylight level may be low. The controller may further determine the low ambient light level based on location and/or date. In this way, the controller may be configured to adjust a lighting level of the output emission 26 emitted from the luminescent portion 14 such that the output emission 26 provides a desired level of light output corresponding to the ambient light level.

In an exemplary embodiment, the controller of the lighting system 12 may be configured to detect and/or learn a usage pattern of the vehicle based on one or more of the control inputs 72. For example, the controller may track and identify times of the day and days of the week (additionally calendar months) that correspond to a schedule of use of the vehicle. The controller may identify that the vehicle is typically utilized during specific portions of the day (e.g. 7:00 AM-9:00 AM and 4:30 PM-6:15 PM Monday through Friday) by detecting usage of the vehicle based on the location signal 72*c*, the door access signal 72*d*, and/or the ignition signal 72*e*. Based on the usage schedule of the vehicle, the controller may selectively activate the light source 24 such that when a passenger or operator of the vehicle approaches the vehicle, the luminescent portion 14 may be substantially charged. In this way, the controller may anticipate the usage of the vehicle such that the luminescent portion 14 is charged when use of the vehicle begins by a passenger or an operator of the vehicle.

In some embodiments, the controller may identify a typical or consistent period of usage of the vehicle and precede such a period by selectively activating the light source 24. The period of activation preceding the usage of the vehicle may correspond to a time required to significantly charge one or more persistent luminescent materials utilized in the luminescent portions 14. Upon detection of the passenger or operator of the vehicle, accessing or entering the vehicle, the controller may deactivate the light source 24 such that the excitation emission is stopped, but the output emission may continue to emit the output emission 26 due to the charge of the persistent luminesce output in the form the output emission 26. As discussed herein, the controller may identify an occupancy or access of the vehicle by monitoring one or more of the control inputs 72.

Figure 5:
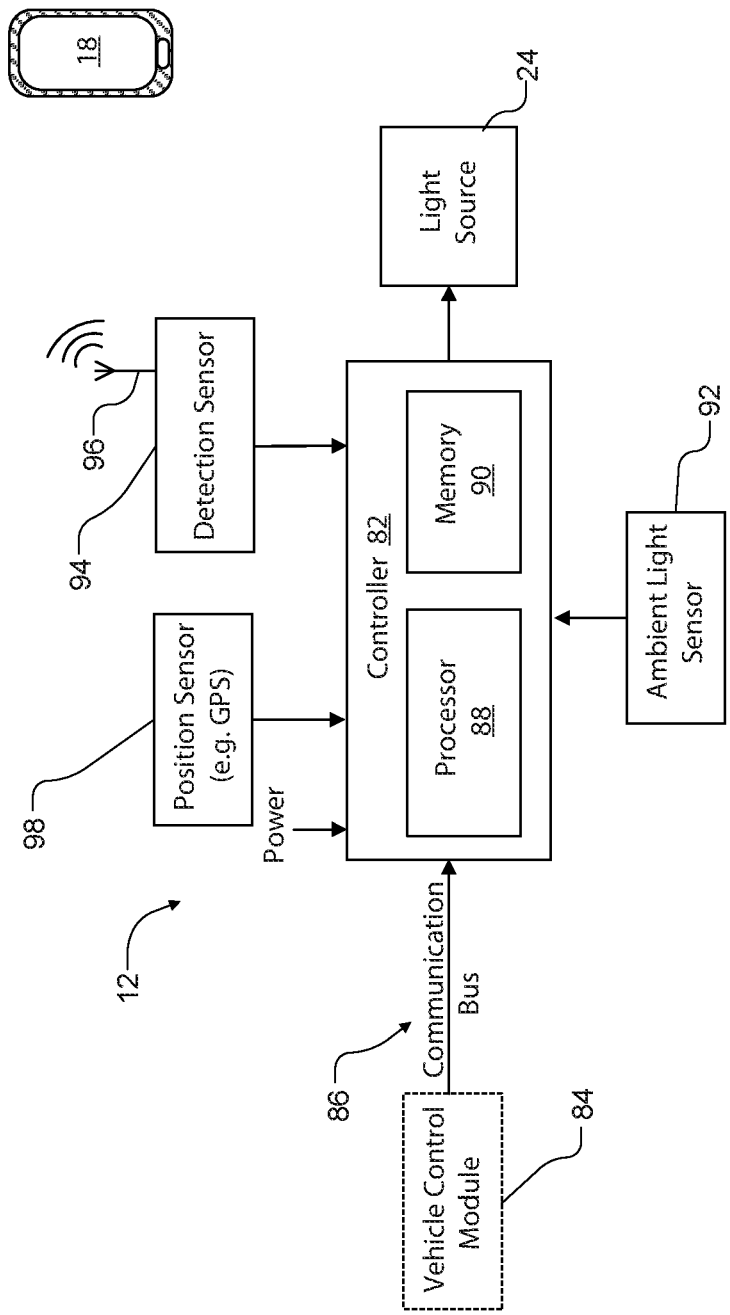
FIG. 5 is a block diagram of a lighting apparatus comprising a light producing assembly in accordance with the disclosure.

Referring to FIG. 5, a block diagram of a lighting apparatus 10 or system comprising the light producing assembly 30. The controller 82 is in communication with the light assembly 30 via the electrode terminals. The controller 82 may be in communication with the vehicle control module 84 via a communication bus 86 of the vehicle. The communication bus 86 may be configured to deliver signals to the controller 82 identifying various vehicle states. For example, the communication bus 86 may be configured to communicate to the controller 82 a drive selection of the vehicle, an ignition state, a door open or ajar status, a remote activation of the light producing assembly 30, or any other information or control signals that may be utilized to activate or adjust the output emission 26. Though the controller 82 is discussed herein, in some embodiments, the light producing assembly 30 may be activated in response to an electrical or electro-mechanical switch in response to a position of the closure of the vehicle.

The controller 82 may comprise a processor 88 having one or more circuits configured to receive the signals from the communication bus 86 and output signals to control the light producing assembly 30 to emit the output emission 26. The processor 88 may be in communication with a memory 90 configured to store instructions to control the activation of the light producing assembly 30. The controller 82 may further be in communication with an ambient light sensor 92. The ambient light sensor 92 may be operable to communicate a light condition, for example a level brightness or intensity of the ambient light proximate the vehicle. In response to the level of the ambient light, the controller 82 may be configured to adjust a light intensity output from the light producing assembly 30. The intensity of the light output from the light producing assembly 30 may be adjusted by controlling a duty cycle, current, or voltage supplied to the light producing assembly 30.

The controller 82 may further be in communication with a proximity or detection sensor 94. In various implementations, the detection sensor 94 may correspond to various components that may be in communication with the controller 82. For example, the detection sensor 94 may be configured to communicate the detection signal 72*f* to the controller 82 in response to a presence or proximity of the mobile device 18. The detection sensor 94 may correspond to a wireless radio transceiver in communication with the controller 82. The detection sensor 94 may be configured to detect an approaching occupant by detecting a communication of the mobile device 18 via an antenna 96 of the wireless radio transceiver. In this way, the controller 82 may identify that a potential occupant of the vehicle 8 is approaching based on a detection or proximity profile of the mobile device 18. The wireless radio transceiver may correspond to a wireless communication module, which may include for example Bluetooth communications, Bluetooth Low Energy (BLE), Zigbee, WiFi or other band wireless communications. The mobile device 18 may correspond to a computer, laptop, tablet PC, phone, or similar devices.

In some embodiments, the controller 82 may further be in communication with a position sensor 98. The position sensor 98 may be configured to identify a location of the vehicle 8 and may correspond to a global positioning (GPS) device. In response to identifying the location of the vehicle 8, the controller 82 may selectively activate the light source 24 to charge the luminescent portion 14. For example, the controller 82 may selectively activate the light source 24 in response to the vehicle 8 approaching a parking location.

As previously discussed, the controller 82 may utilize the location signal from a global positioning (GPS) device to identify a parking location and to determine if the vehicle 8 is approaching the parking location. The controller 82 may determine the parking location in response to the location signal indicating that the vehicle 8 is parked for a predetermined period of time in a location. Such a location and local surrounding area (e.g a parking lot) may be stored in the memory 90 of the controller 82 and identified as a parking location. In this way, the controller 82 may be configured to identify that the vehicle 8 is approaching the parking location and activate the light source 24 in response to the vehicle 8 being within a predetermined distance of the parking location. Once the vehicle 8 reaches the parking location, the luminescent portion 14 may be significantly charged such that the vehicle accessory 16 is visible to the occupant of the vehicle 8.

In some embodiments, the controller 82 may be in communication with additional devices that may be utilized in combination with the detection sensor 94 and/or the position sensor 98 to activate the light source 24 to charge the luminescent portion 14. For example, the controller 82 may be in communication with a mobile device, a cell phone signal detection device, a radar proximity system (e.g. blind spot warning and/or lane departure signal), and ultrasonic proximity detector (e.g. parking sensors on various portions of the exterior of the vehicle), cameras or imager (e.g. 360 degree surveillance or autonomous operation cameras, and driver assist cameras (e.g. backup cameras, blindspot cameras, forward directed cameras, etc.). Additionally, the controller 82 may be in communication with a capacitive sensor, which may be disposed proximate a window, bumper, and various panels or trim of the vehicle, electro-magnetic sensors, laser sensors, and/or radar systems, which may be utilized in adaptive cruise control and/or driver assist systems. Accordingly, the detection sensor 94 and the various additional sensors discussed herein may be utilized by the controller 82 to activate the light source 24.

In the various configurations discussed herein, the detection sensor 94 may be in communication with the controller 82 and operable to detect an approaching occupant of the vehicle. In some implementations, the proximity sensor may be operable to identify a particular person or group of persons as detected by the detection sensor 94. In such implementations, the detection sensor 94 may be operable to identify an owner of the vehicle, family member of the vehicle owner, owner of a vehicle that is the same brand or company of the vehicle, etc. In such implementations, the controller 82 may utilize the detection sensor 94 to identify a signature or signal of a mobile device 18.

The mobile device 18 may correspond to a fob, key, cellular phone, tablet, computer, etc. detected proximate the vehicle. In this way, the controller 82 may detect a specific person or person belonging to a group based on the radio frequency signal and activate a lighting operation in response to the detection. By identifying different group of people affiliated with the vehicle or a manufacturer of the vehicle, the controller may be operable to control the lighting a lighting operation of the lighting apparatus 10 to emit light in a different timing, pattern, color, etc. based on a specific group or person approaching or departing from the vehicle.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
   a light producing assembly of an accessory port of the vehicle comprising a persistent luminescent portion configured to charge in response to receiving an excitation emission comprising a first wavelength from a light source;
   a detection sensor configured to detect a mobile device proximate the vehicle; and
   a controller configured to activate the light source in response to the detection of the mobile device to charge the persistent luminescent portion to emit an output emission comprising a second wavelength.

2. The illumination apparatus according to claim 1, wherein the detection sensor corresponds to a wireless radio transceiver in communication with the controller.

3. The illumination apparatus according to claim 2, wherein the detection sensor is configured to detect an approaching occupant by detecting a communication of the device via the wireless radio transceiver.

4. The illumination apparatus according to claim 3, wherein the controller is configured to identify that the occupant is approaching the vehicle based on a proximity profile of the device.

5. The illumination apparatus according to claim 4, wherein the controller is configured to charge the persistent luminescent portion in response to the detection of the approaching occupant.

6. The illumination apparatus according to claim 1, further comprising a global positioning device configured to identify a position of the vehicle in communication with the controller.

7. The illumination apparatus according to claim 6, wherein the controller is configured to identify a location where the vehicle is parked for a predetermined period of time based on the location from the global positioning device.

8. The illumination apparatus according to claim 1, further comprising a door sensor in communication with the controller, wherein the door sensor is configured to identify an ajar status of a door of the vehicle.

9. An illumination apparatus for a vehicle comprising:
   a lighting assembly disposed proximate an electronic accessory port, the electronic accessory port comprising a persistent luminescent portion configured to charge in response to receiving an excitation emission from a light source;
   a location detection device configured to detect a location of the vehicle; and
   a controller configured to activate the light source to emit the excitation emission in response to the location of the vehicle matching a predetermined parking location.

10. The illumination apparatus according to claim 9, wherein the controller is configured to identify the predetermined parking location in response to the location detection device identifying that the vehicle is parked in the predetermined parking location for a predetermined period of time.

11. The illumination apparatus according to claim 9, wherein the controller is operable to identify that the vehicle is approaching the parking location in response to the location of the vehicle being within a predetermined distance of the parking location.

12. The illumination apparatus according to claim 11, wherein the controller is further configured to charge the persistent luminescent portion to emit an output emission of light sustained by the charge after the excitation emission is deactivated in response to the identification that the vehicle is approaching the parking location.

13. The illumination apparatus according to claim 9, wherein the controller is further configured to activate the excitation emission from a time period when the vehicle is within the predetermined distance to a time when the vehicle is parked proximate the parking location thereby charging the persistent luminescent portion.

14. The illumination apparatus according to claim 9, wherein the excitation emission corresponds to a first color of light and the output emission corresponds to a second color of light different from the first color.

15. The illumination apparatus according to claim 9, wherein the lighting assembly comprises a first light generating layer printed in a first liquid suspension configured to emit the excitation emission.

16. The illumination apparatus according to claim 9, further comprising a light sensor in communication with the controller configured to communicate an ambient light signal to the controller to control the intensity of the at least one of the excitation emission.

17. The illumination apparatus according to claim 9, wherein the lighting assembly forms a portion of the electronic accessory port configured to illuminate the electronic accessory port.

18. An illumination apparatus for a vehicle comprising:
   a light producing assembly forming a portion of an electronic accessory of the vehicle, the light producing assembly comprising a persistent luminescent portion configured to:
      charge in response to an excitation emission from a light source; and
      emit an output emission comprising a second wavelength of light sustained by the charge after the excitation emission is deactivated;
   a wireless radio transceiver configured to detect a mobile device proximate the vehicle; and
   a controller configured to activate the light source in response to the detection of the mobile device proximate to the vehicle thereby charging the persistent luminescent portion.

19. The illumination apparatus according to claim 18, wherein the excitation emission corresponds to a first color of light and the output emission corresponds to a second color of light different from the first color output in response to the persistent luminescent portion receiving the excitation emission.

* * * * *